W. K. BAUHAUS.
SAFETY TIRE VALVE.
APPLICATION FILED SEPT. 6, 1918.
1,330,108.
Patented Feb. 10, 1920.
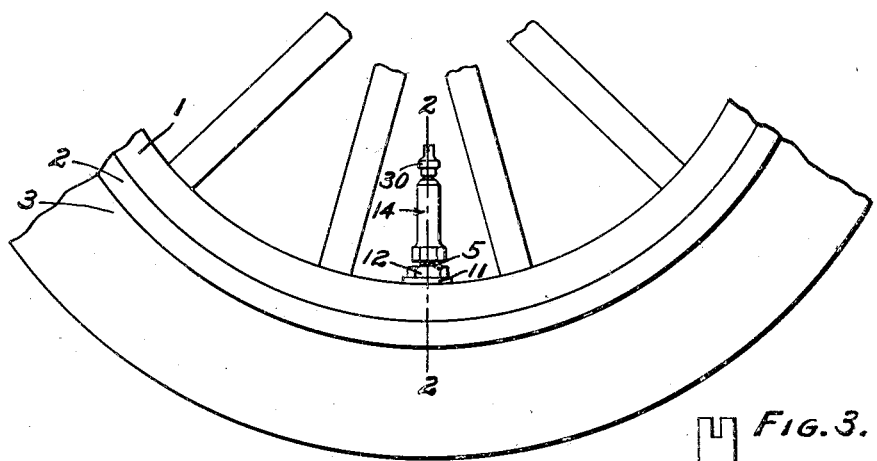
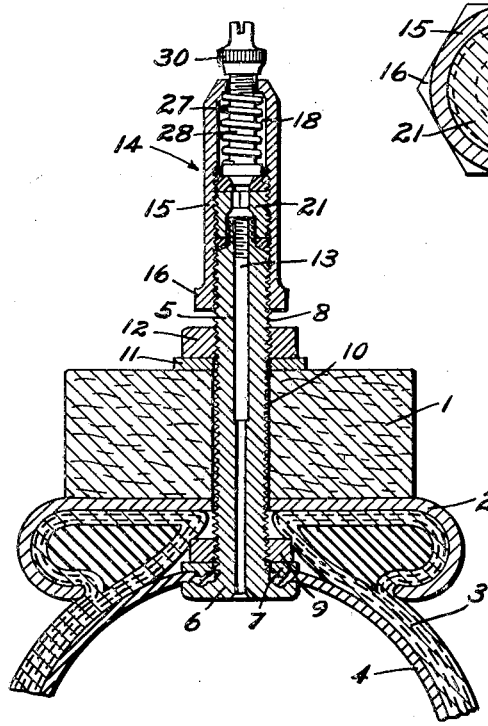
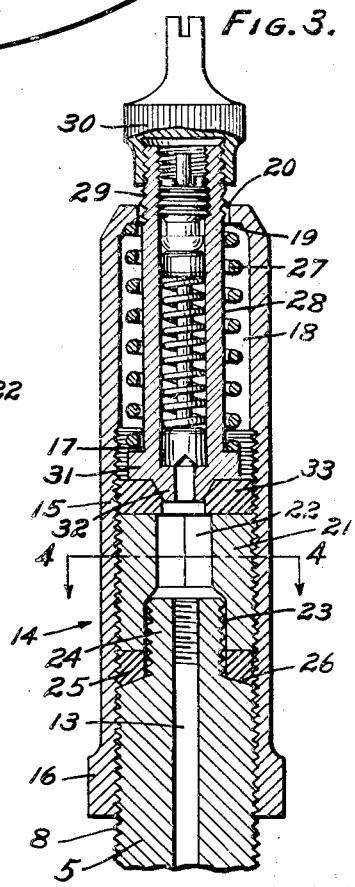
INVENTOR
WILLIAM K. BAUHAUS
BY *Hazard & Miller*
ATTORNEYS.

UNITED STATES PATENT OFFICE.

WILLIAM K. BAUHAUS, OF CARPENTERIA, CALIFORNIA.

SAFETY TIRE-VALVE.

1,330,108.  Specification of Letters Patent.  Patented Feb. 10, 1920.

Application filed September 6, 1918. Serial No. 252,963.

*To all whom it may concern:*

Be it known that I, WILLIAM K. BAUHAUS, a citizen of the United States, residing at Carpenteria, in the county of Santa Barbara and State of California, have invented new and useful Improvements in Safety Tire-Valves, of which the following is a specification.

My object is to make a safety tire valve, and my invention consists of the novel features herein shown, described and claimed.

Figure 1 is a fragmentary side elevation of a wheel and pneumatic tire showing a safety tire valve embodying the principles of my invention in position for use.

Fig. 2 is an enlarged sectional detail on the line 2—2 of Fig. 1.

Fig. 3 is a still further enlarged sectional detail of the safety construction and taken upon the same plane as Fig. 2, the wheel rim and tire being broken away.

Fig. 4 is a cross section on the line 4—4 of Fig. 3.

As shown in Fig. 2, the wood felly 1 has a metal tire rim 2 fitting the periphery. The tire casing 3 fits in the rim 2; the inner tube 4 fits in the tire casing 3 and the air valve casing 5 has a head 6 fitting the inner face of the inner tube 4, and the air valve casing extends through the inner tube 4, through the washer 7, and has an external screw thread 8, and the nut 9 is screwed down upon the thread 8 against the washer 7. When the inner tube 4 is placed in the casing 3, and the casing 3 applied to the rim 2 the air valve casing 5 extends through an opening 10 through the rim 2 and through the felly 1. A washer 11 is placed upon the air valve casing 5 against the felly 1, and the nut 12 is screwed down upon the thread 8 against the washer 11. In applying my safety tire valve to this construction, the usual air inlet valve is removed from the air valve casing 5, leaving the chamber 13 empty, and then my safety tire valve 14 is applied.

The details of the safety tire valve 14 are as follows:

The safety valve casing 15 is a long, straight, cylindrical shell having a hexagon head or wrench seat 16 upon the lower end, an internal screw thread 17 extending upwardly from its lower end and matching the screw thread 8, a chamber 18 extending upwardly from its lower end with a shoulder forming a spring seat 19 at the upper end of the chamber, and a central opening 20 surrounded by the shoulder.

The valve seat support 21 is an externally screw threaded plug screwed into the casing 15 from the lower end, and has a squared opening 22 forming a key seat and air passage, the lower end of the squared opening being enlarged and bored round to form the chamber 23 to fit around the cap nipple 24 of the air valve casing 5. A gasket 25 is inserted upwardly into the safety valve casing 15 against the lower end of the valve seat support 21 to fit around the cap nipple 24, and against the shoulder 26 at the upper end of the screw thread 8. Before inserting the valve seat support 21 into the safety valve casing 15 an expansive coil spring 27 is inserted upwardly into the chamber 18 against the shoulder 19. The air inlet valve 28 is inserted upwardly through the chamber 18, through the spring 27 and through the opening 20. The air inlet valve 28 is of the usual internal construction, and has an external screw thread 29 to receive the cap 30 which may be the same cap removed from the nipple 24. A spring seat 31 is formed upon the lower end of the air inlet valve 28 and engages the spring 27. The blow off valve 32 is formed upon the lower end of the air inlet valve 28 below the spring seat 31. A gasket 33 is placed against and around the blow off valve 32, and the valve seat support 21 fits against the gasket 33.

In the practical operation of filling the inner tube 4 with compressed air, the cap 30 is removed, the air hose connected to the nipple 29 and the air pressure turned on, and the air will pass through the air inlet valve 28 to the inner tube 4 until the pressure in the inner tube is sufficient to raise and unseat the blow off valve 32. Then the air will pass outwardly past the spring seat 31, through the chamber 18 and through the opening 20 outside of the air inlet valve casing 28. When the tension of the spring 27 is properly adjusted by inserting a key into the opening 20 and screwing the valve seat support 21 up or down, it will be impossible to over-inflate the tire, and if a tire is inflated when it is cold and stands in the sun until the air becomes hot and expanded to increase the pressure, the surplus pressure will blow off by unseating the valve 32.

The safety valve is applied to a valve equipped with the ordinary air valve, simply by removing the air valve construction from the chamber 13 and screwing the safety valve construction down upon the thread 8 until the gasket 25 fits tightly against the shoulder 26, and any time it is desired to change the adjustment of the spring 27 to regulate the pressure which the valve will hold, the valve may be unscrewed by applying a wrench to the seat 16, removing the safety valve construction and applying a key to the opening 22, and removing the valve seat support 21 up or down.

Thus, I have produced a safety tire valve, the leading feature of which is the mounting of the regular air inlet valve to serve as the stem or movable element of a blow off valve.

While I have shown and described my safety tire valve as an attachment to an old valve casing it is obvious that the principles of my invention may be applied to a construction to be applied direct to the inner tube without the use of the old valve casing.

Various changes may be made without departing from the spirit of my invention as claimed.

I claim:

The combination with a regular Schrader type tire valve having an externally screw-threaded casing and an externally screw-threaded nipple and a shoulder at the end of the casing around the nipple, of a safety valve casing adapted to be screwed upon the tire valve casing and having a chamber extending upwardly from the tire valve casing, the top of the chamber forming a spring seat and there being a central opening through this spring seat; an air inlet valve casing inserted upwardly through the chamber and through the spring seat; an air inlet valve in the inlet valve casing; a spring inserted upwardly into the chamber around the air inlet valve casing; a spring seat upon the lower end of the air inlet valve casing against the spring; a blow off valve upon the lower end of the air inlet valve casing below the spring seat; a valve seat support screwed upwardly into the chamber and having a valve seat engaging the blow off valve, said valve seat support being adjustable in the chamber to adjust the tension of the spring; a gasket inserted upwardly into the safety valve casing against the lower end of the valve seat support; the valve support having an opening forming a key seat and an air passage and the lower end of the opening being enlarged to fit loosely around the tire valve casing nipple.

In testimony whereof I have signed my name to this specification.

WILLIAM K. BAUHAUS.